(12) United States Patent
Intscher-Owrang et al.

(10) Patent No.: US 12,515,419 B2
(45) Date of Patent: Jan. 6, 2026

(54) CLOTHING ITEM INCLUDING AT LEAST ONE THREE-DIMENSIONAL CONTOUR, AND METHOD OF MAKING THE SAME

(71) Applicant: Simplifyber, Inc., Wilmington, DE (US)

(72) Inventors: Maria Intscher-Owrang, Brooklyn, NY (US); Philip Cohen, Nashville, TN (US); Yee Do Chun, Vancouver (CA); Yizhou Sang, Burnaby (CA); Svena Rui Xin Yu, Vancouver (CA); William Benjamin Montgomery Tew, Sheffield (GB)

(73) Assignee: Simplifyber, Inc., Raleigh, NC (US)

( * ) Notice: Subject to any disclaimer, the term of this patent is extended or adjusted under 35 U.S.C. 154(b) by 0 days.

(21) Appl. No.: 18/615,418

(22) Filed: Mar. 25, 2024

(65) Prior Publication Data
US 2024/0227322 A1    Jul. 11, 2024

Related U.S. Application Data

(63) Continuation of application No. 17/466,792, filed on Sep. 3, 2021, now Pat. No. 11,958,256.
(Continued)

(51) Int. Cl.
*A41D 27/00* (2006.01)
*B29C 33/38* (2006.01)
(Continued)

(52) U.S. Cl.
CPC .............. *B29C 70/24* (2013.01); *A41D 27/00* (2013.01); *B29C 33/3814* (2013.01);
(Continued)

(58) Field of Classification Search
CPC ... A41D 1/00; A41D 1/04; A41D 1/06; A41D 1/14; A41D 1/18; A41D 2500/30;
(Continued)

(56) References Cited

U.S. PATENT DOCUMENTS 3,179,955 A * 4/1965 Worth ...................... A41D 1/00
2/114
3,644,251 A * 2/1972 Wilhelmi ............... C11D 15/00
162/168.3
(Continued)

FOREIGN PATENT DOCUMENTS

JP    2003239200 A    8/2003
JP    2007126766 A    5/2007
(Continued)

OTHER PUBLICATIONS

EP search report for EP21865209.7 dated Aug. 1, 2024.
JP Office action for JP2023-515157 dated Nov. 5, 2024.
JP office action for JP2023-515157 dated Aug. 21, 2025.

*Primary Examiner* — Michael A Tolin
(74) *Attorney, Agent, or Firm* — Getz Balich LLC

(57) ABSTRACT

The present invention is directed to a method of making at least a portion of a garment that includes at least one three-dimensional contour. The disclosed method includes providing a fiber and solvent mixture that includes fibers and a solvent capable to causing a plurality of covalent bonds to be created between the fibers. In many embodiments, the plurality of covalent bonds form when a catalyst, such as heat, is provided to the fiber and solvent mixture. The process can be performed using, for example, either a 3D printer or mold form. The fibers used can be natural, synthetic, or a blend of natural and/or synthetic fibers. The solvent preferably includes ionic salts in water.

11 Claims, 7 Drawing Sheets

Related U.S. Application Data

(60) Provisional application No. 63/074,695, filed on Sep. 4, 2020.

(51) Int. Cl.

| | | |
|---|---|---|
| *B29C 41/00* | (2006.01) | |
| *B29C 41/10* | (2006.01) | |
| *B29C 65/00* | (2006.01) | |
| *B29C 65/48* | (2006.01) | |
| *B29C 70/24* | (2006.01) | |
| *B29C 70/68* | (2006.01) | |
| *B32B 3/26* | (2006.01) | |
| *D04H 3/011* | (2012.01) | |
| *D04H 3/013* | (2012.01) | |
| *D04H 3/12* | (2006.01) | |
| *D06M 15/263* | (2006.01) | |
| *D06M 101/06* | (2006.01) | |

(52) U.S. Cl.
CPC ............ *B29C 41/003* (2013.01); *B29C 41/10* (2013.01); *B29C 65/4895* (2013.01); *B29C 66/69* (2013.01); *B29C 70/682* (2013.01); *B32B 3/263* (2013.01); *D04H 3/011* (2013.01); *D04H 3/013* (2013.01); *D04H 3/12* (2013.01); *D06M 15/263* (2013.01); *A41D 2500/30* (2013.01); *B32B 2437/00* (2013.01); *D06M 2101/06* (2013.01); *D10B 2201/00* (2013.01); *D10B 2501/04* (2013.01)

(58) Field of Classification Search
CPC .. A41H 43/00; B29C 33/3814; B29C 41/003; B29C 41/02; B29C 41/04; B29C 41/08; B29C 41/10; B29C 43/003; B29C 43/02; B29C 43/041; B29C 43/12; B29C 65/4895; B29C 70/12; B29C 70/24; B29C 70/682; B29D 99/0064; B29D 99/0067; B29L 2031/00; B29L 2031/48; B29L 2031/4807; B29L 2031/4814; B29L 2031/4842; B29L 2031/4857; B29L 2031/4864; B29L 2031/4871; B29L 2031/4878; B29L 2031/4885; B32B 1/00; B32B 3/263; B32B 2437/00; B32B 2437/02; B32B 2437/04; B33Y 80/00; D04H 1/425; D04H 1/643; D04H 1/732; D04H 1/76; D04H 3/011; D04H 3/013; D04H 3/12; D06M 15/263; D06M 2101/06; D10B 2201/00; D10B 2501/00; D10B 2501/02; D10B 2501/04; D10B 2501/041; D10B 2501/042; D10B 2501/06

See application file for complete search history.

(56) References Cited

U.S. PATENT DOCUMENTS

| | | | |
|---|---|---|---|
| 4,200,937 A * | 5/1980 | Off | ............ B29C 41/006 2/227 |
| 6,531,078 B2 | 3/2003 | Laine | |
| 8,202,379 B1 | 6/2012 | Delong | |
| 9,771,675 B2 | 9/2017 | Altshuler | |
| 10,392,731 B2 | 8/2019 | Esponnette | |
| 2003/0220039 A1 | 11/2003 | Chen | |
| 2004/0123368 A1 | 7/2004 | Bingham | |
| 2010/0221972 A1 | 9/2010 | Soane | |
| 2016/0221233 A1* | 8/2016 | Kiiskinen | ............ B29C 44/06 |
| 2018/0256408 A1* | 9/2018 | Huang | ............ A61F 13/15707 |

FOREIGN PATENT DOCUMENTS

| | | | |
|---|---|---|---|
| WO | 2014080084 A1 | 5/2014 | |
| WO | 2018183605 A1 | 10/2018 | |
| WO | 2018183651 A1 | 10/2018 | |
| WO | 2020023027 A1 | 1/2020 | |

* cited by examiner

CLOTHING ITEM INCLUDING AT LEAST ONE THREE-DIMENSIONAL CONTOUR, AND METHOD OF MAKING THE SAME

CROSS REFERENCE TO RELATED APPLICATION

This application is a continuation of U.S. Non-Provisional patent application Ser. No. 17/466,792, filed Sep. 3, 2021, which claims the benefit of U.S. Provisional Patent Application No. 63/074,695, filed Sep. 4, 2020, both of which are incorporated by reference herein in their entirety.

FIELD OF THE INVENTION

The present invention relates generally to garment making and, more particularly, to methods for making clothing items having at least one three-dimensional contour.

BACKGROUND

The current clothes-making process generally consists of 5 steps: fiber processing, yarn spinning, cloth weaving, cloth cutting, and sewing cut pieces of cloth together. Each step is a separate, inefficient, labor-intensive process that often requires transport of materials between the steps. Scrap materials (e.g., cloth that is cut but not used) is often simply discarded, adding to the waste in the process.

In fact, many would argue that the current production method of garments is unsustainable for the planet. The apparel industry is responsible for between approximately 8 and 10% of humanity's carbon emissions worldwide, approximately 20% of water pollution and more than an estimated 15 million tons of textile waste annually. A significant part of this impact comes from the above-identified inefficiencies in the manufacturing process.

There have been many attempts to mitigate the fashion industry's negative environmental impact by choosing better raw materials, localizing production and/or adding recycling programs. While these are all important, their benefits are limited due to the current subtractive method of cutting out shapes from a length of cloth and sewing the pieces together. Therefore, there is a need to address these shortcomings in the art.

SUMMARY

According to one aspect of the present invention, a method of making at least a portion of a garment that includes at least one three-dimensional contour is disclosed. In one embodiment, the method comprising the following steps: 1) providing a fiber and solvent mixture that includes a fiber combined with a solvent capable to causing covalent bonds to be created between the fibers; 2) providing the fiber and solvent mixture to a 3D printer; 3) providing a pre-determined garment design in the form of a digital file to the 3D printer such that the fiber and solvent mixture is extruded from the 3D printer in a pre-determined pattern; and 4) removing at least a portion of the solvent from the fiber and solvent mixture after the fiber and solvent mixture has been extruded from the 3D printer and the plurality of covalent bonds have formed between the fibers. In some embodiments, a catalyst is provided to the fiber and solvent mixture in order to cause and/or control the rate of the formation of the covalent bonds between fibers. For example, heat is often a suitable catalyst.

According to another aspect of the present invention, a second method of making at least a portion of a garment that includes at least one three-dimensional contour is disclosed. The method includes the following steps: 1) providing a fiber and solvent mixture that includes a fiber that is broken down into cellulose combined with a solvent capable to causing covalent bonds to be created between the fibers when a catalyst is provided; 2) providing a mold form that defines at least one three-dimensional contour; 3) providing the fiber and solvent mixture to the mold form; and 4) providing heat as a catalyst to cause a plurality of bonds to form between the fibers in the fiber and solvent mixture.

According to a further aspect of the present invention, another method of making at least a portion of a garment is disclosed. The method includes providing an aqueous suspension comprising at least one type of fiber and at least one surfactant, aerating the aqueous suspension to generate a foam, and providing a mold that includes a void having at least one three-dimensional contour for the clothing item. The mold includes at least one hole sized to permit liquid to exit the mold during the molding process. The foam is delivered to the mold and then dried and at least some of the liquid in the foam exits the mold through the at least one hole in the mold. The shaped garment (or portion thereof) is removed from the mold.

According to an even further aspect of the present invention, another method of making at least a portion of a garment is disclosed. The method includes providing at least one piece of pre-formed non-woven material, saturating the non-woven material with at least one of a solvent, salt and binding agent, and placing the saturated non-woven material in a mold. The mold includes a void having at least one three-dimensional contour for the clothing item and at least one hole sized to permit liquid to exit the mold. The foam is dried and at least some of the liquid in the foam exits the mold through the at least one hole in the mold during the drying process. The shaped garment (or portion thereof) is removed from the mold.

According to an even further aspect of the present invention, the fiber used in any of the above embodiments can include at least one or more types of natural fibers. Alternatively, the fiber used can include one or more types of synthetic fibers. In a further alternative, a blend of synthetic and natural fibers can be utilized.

One advantage of the present invention is the fact that several steps utilized in traditional garment making (e.g., thread making, weaving, and cutting) are either reduced or eliminated, resulting in a more eco-friendly and efficient process.

Another advantage of the present invention permits a designer to create a garment using an additive process to enables customization capabilities not available in traditional garment making.

A further advantage of the present invention is the present invention permits garments to be digitized and easily transmitted so that the garment item can be produced locally wherever equipment (e.g., 3D printer) and supplies are available. For example, the garment can be produced in an end user's home on demand.

An even further advantage is the potential reduction in cost due to the reduced dependence on manual labor.

An even further advantage is that the garment may be able to virtually fitted to the client during the design stage and then manufactured to match the specifications.

DETAILED DESCRIPTION OF THE INVENTION

Figure 1:
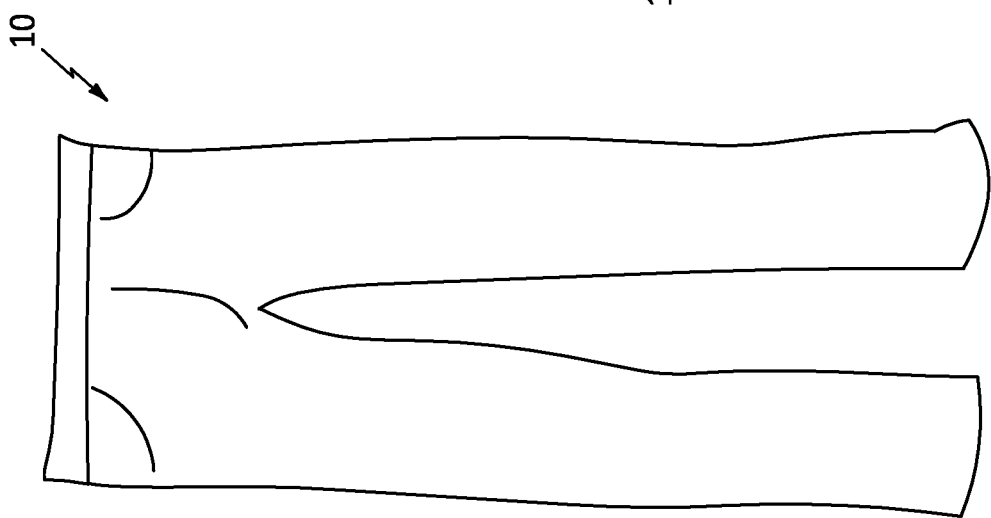
FIG. 1 is a perspective view of one embodiment of the present invention in the form of a pair of pants.

One embodiment of the present invention is generally identified by the numeral 10 in FIG. 1. As shown, the present invention includes a clothing items, or garment, that includes at least one three-dimensional contour formed via an additive process using fiber (preferably natural fiber), solvent and (optionally) a catalyst, as described herein. Foam forming processes and dry fiber shaping processes are also specifically described. While the processes of the present invention are all certainly capable of producing a generally two-dimensional fibrous object, the utility of the invention lies the ability to create a cloth-like material that can form at least a portion of a clothing item, wherein the clothing item has at least one three-dimensional contour at the time of creation.

As used herein, the terms "garment" and "clothing items" are intended to carry the same, ordinary definition and will be used interchangeably in the present disclosure. The term "nonwoven" refers herein to a fabric consisting of fibers oriented in the plane with no weaving of fibers, threads, or yarns into regular patterns, and bonded to each other by physical or chemical means. The term "foam stabilizer" refers herein to any additive to a foam which will result in the wet foam better resisting separation and loss of foam structure over time. The term "softener" refers herein to any additive to a foam, fiber, or nonwoven which will result in the final material being more malleable, less stiff, or perceptibly softer to the touch, or any combination thereof. The term "strength agent" refers here to any additive to a foam, fiber, or nonwoven which will result in the final material being stronger or stiffer in dry or wet conditions, or any combination thereof.

Figure 3:
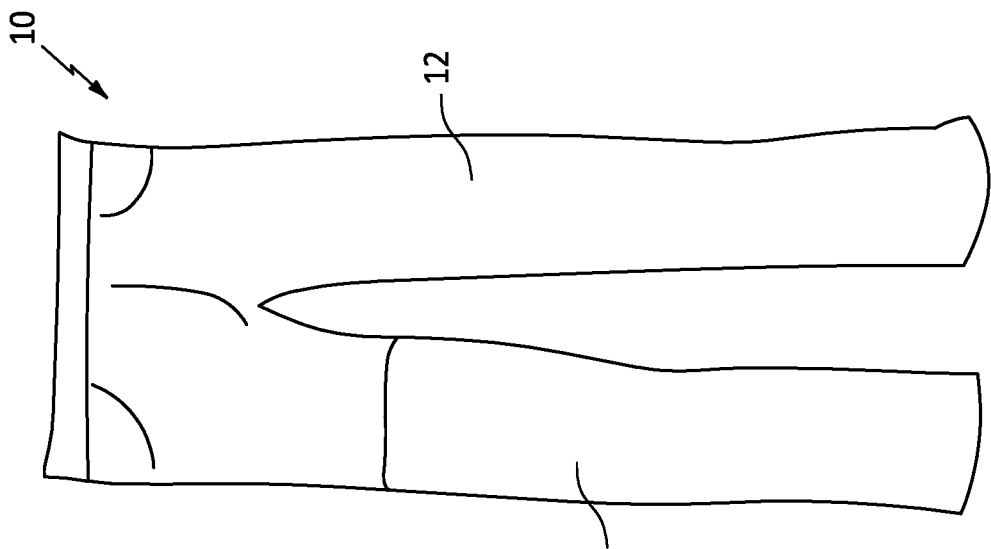
FIG. 3 is a perspective view of the embodiment shown in FIG. 2 with the two portions attached to one another.
Figure 2:
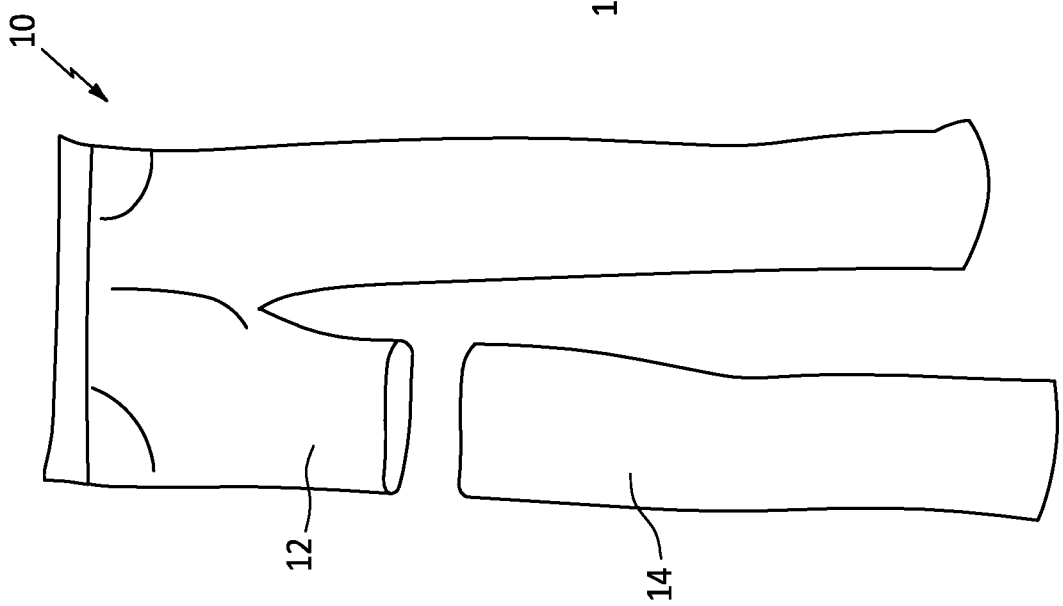
FIG. 2 is a perspective view of a second embodiment of the present invention in the form of a pair of pants assembled from at least two portions.

In another embodiment, as shown for example in FIG. 2, the clothing item 10 includes at least a first component 12 and a second component 14 wherein at least the first component 12 is created by one of the additive processes disclosed herein. As shown in FIG. 3, the separate components 12, 14 of FIG. 2 have been attached to one another in a secondary process, creating a clothing item. Although the embodiments shown in FIGS. 1-3 are directed to a pair of pants, the present invention is applicable to any type of clothing item that is known to be worn by a person including, but not limited to, shirts, shorts, dresses, skirts, pants, socks, footwear, vests, sweaters, scarves, hats, gloves, mittens and the like.

The process of the present invention includes providing a fiber and solvent mixture that includes fiber and a solvent, and then undertaking a forming step (discussed below) that results in at least a portion of a three-dimensional garment. In some embodiments, a catalyst is provided during the forming step in many embodiments to either cause, facilitate or enhance the chemical reaction between the solvent and the fibers that results in chemical bonding between fibers. The forming step of the present invention can be carried out in any known process; however, three-dimensional printing and/or molding the garment (or portion thereof) having at least one three-dimensional contour are preferred. Alternatively, instead of the solvent, a bonding agent or glue can be utilized.

The fiber can be either natural or synthetic. In the case of natural fibers, virgin or recycled plant-based materials such as cotton, linen, hemp, viscose, wood, kapok, cork, agricultural waste, paper, bacterial cellulose, or the like can be utilized. Alternatives are mycelium, collagen, and wool/hair. Prior to use, the fibers may be reduced in size and/or broken down to the basic structural component of the fiber. For example, in the case of certain plant-based natural fibers, the fiber may be broken down to cellulose. In other examples, such as with synthetic fibers, the size of the fiber may be reduced. The actual size of the fiber may vary depending on the application, and the desired end product.

While natural fibers are generally preferred because they are biodegradable and recyclable, the present invention is not so limited. For example, synthetic fibers, such as rayon, nylon, polyester, acrylic, and spandex are examples of synthetic fibers that can also be utilized and may have particular utility because they can be selected and/or designed to have the end designer's desired properties.

In addition to various blends of multiple types of natural fibers or multiple types of synthetic fibers, in some embodiments, some blends may include one or more of either or both natural and synthetic fibers together in the formation of a clothing item.

The specific characteristics of the fibers, such as fiber length, porosity, curl and thickness may be taken into account when designing the three-dimensional garment. For example, more absorbent fibers, such as cotton, may be particularly well-suited due to their porous nature. Similarly, the fiber lengths will affect the strength of the end product, with shorter fibers generally resulting in weaker material. Preferably, fibers used range between about 0.1 cm and about 7.5 cm. Short or shorter fibers are generally considered to include fibers having a length in the range approximately between about 0.1 cm and approximately about 1.0 cm. Long or longer fibers include fibers that have a length ranging approximately between about 1.0 cm and about 7.5 cm. By weight, the amount of fiber provided is generally equal to the desired weight of the fiber in the garment (or portion thereof), minus any portions that will be removed in a secondary operation.

Numerous types of solvents may be utilized in the process of the present invention. According to one aspect of the present invention, a solvent that includes ionic salts in water are utilized. NMMO is also found to have particular utility. The solvent causes the fibers to bond together at the molecular level. This molecular (covalent) bonding creates a bond between the fibers so they will hold together without the need for glue or other materials to be introduced into the mixture. An alternative or supplement to this chemical process could be cellulose microfilaments used as a binding agent. A second alternative to solvent could be a naturally derived glue such as methyl cellulose. Preferably, whenever possible, the solvent is used in a closed loop process, where both the chemicals and the water in the solvent are recycled repeatedly. The type, amount, and concentration of the solvent depends on the exact application and type of garment.

In order for the fibers and solvent to create the bonding necessary to create the clothing item, a catalyst, such as heat or cold, is often necessary to initiate, control and/or accelerate the reaction may be necessary. More specifically, heat acts as the catalyst for the chemical reaction in many embodiments between the solvent and natural fibers, allowing bonds to be created at the molecular level by covalent bonding. Generally speaking, the longer the catalyst is applied, the more bonds will be formed. As a result, the end product will likely have more structural stability. As a result, it will be necessary for the designer to control the reaction so that the desired level of bonding occurs, thus yielding the desired result. For example, if the catalyst is applied for a relatively short period of time (e.g., a few milliseconds), fewer bonds will form, and the effect will be a more pliable, supple object. Conversely, the longer a catalyst is applied, more bonds will form, and the effect will be a harder, less pliable object. The heat source can be any known to one of skill in the art. However, use of a laser or by energy radiated in another wavelength, such as ultrasound, have particular utility. Alternative heat sources can also be applied by direct contact with or close proximity to a heating element, or a source of ultrasonic vibrations (e.g., an ultrasonic horn). Alternatively, instead of heat, the catalyst could be oxygen or other chemicals/enzymes.

As noted above, several different processes can be utilized including, but not limited to, 3D printing and molding.

With respect to 3D printing of garment, the printer can create the garment in an additive process. A combination of fibers and solvent are provided in 3D printer in the form of a paste, or gel. The mixture is then extruded in a predetermined line or pattern such that the paste is "printed" onto a base in one or more layers. Optionally, and depending on the composition of the material, as the lines are being printed, the catalyst, e.g., heat, may be applied either with the part of the machine that is extruding the mix, or by some additional heating element (e.g., laser, ultrasound or other wavelength, or by ultrasonic vibration). Once extruded, the mixture will bond together into a solid line/shape, dictated by a computer connected to the device. Eventually, as more and more material is extruded from the 3D printer in the pre-determined pattern, a resulting item is created that consists of a three-dimensional having a contour. A user pre-programs the 3D printer with the shape of the clothing item to be printed prior to commencing the additive process of printing the clothing item, or portion thereof. Naturally, while taking into account the inherent limitations of the ability of a 3D printer, a designer can freely create nearly any type of clothing item, or portion thereof. After or during the printing process, a coagulation bath, such as water, can be used "crosslink," or to create more bonds within the printed material. The resulting material may then be dried in the freezer or freeze-dried to preserve gaps in the material where there was once water, allowing the resulting material to retain flexibility.

Alternatively, a 3D printer can start with a volume of the mixture, whether solid, liquid or powder. In this case, heat is introduced to the mixture at specific points via laser, ultrasound or other wavelength (guided by a computer attached to the device). In distinct locations within the volume of the fiber/solvent mixture that has been locally heated, a reaction will occur and the result is a fibrous solid where bonding has taken place. In essence, the process sculpts a pre-determined three-dimensional shape out of the volume. The remainder of the mixture can then be washed or blown away, leaving only the hardened 3D shape. In at least some instances, the unused portion can be used in future, similar processes in order to minimize or reduce waste.

The present invention may also, as mentioned above, utilize a molding operation. The mold form used in the process may be a positive or negative impression of the pre-determined shape. To give the designer new dexterity in the cloth, fabric, or garment-making process, the mold may be "fixed" (as in, unable to be changed) or it may be sculpted/"shaped" either manually (through touch) or mechanically (through a system of connected devices; e.g., a computer connected to the mold, whereby the size and shape of the mold are controlled through a computer-based software program). The mixture or slurry containing fibers and solvent is added to the outside of the mold (if a positive impression is used) or the inside of the mold (if a negative impression is used) either manually (e.g., poured) or using automation (e.g., via an injection molding process). In embodiments where the fiber and solvent mixture is added to the mold via an injection molding process, a system of small holes may be used to transport the slurry from a storage container to the surface (if using a positive impression) or the interior (if using a negative impression) of the mold. Depending upon the composition of the slurry, water may need to be removed from the slurry once it has been poured. A series of holes or at least one hole in the mold could help remove the water. Optionally, and depending upon the composition of the material, heat may then be applied to the fiber and solvent mixture from one of the appropriate heat sources described above. The mold may also contain a heat source; and may have separate storage chambers for fabric fibers, chemical compounds, water, glue, dyes, and/or other key ingredients of the mixture/slurry. In essence, the mold itself can be designed to function in a similar fashion to the 3D printer-like tool described above. An oven, heat source, freezer or freeze-dryer may be used to help dry the material. A coagulation bath (such as water) may also be used to create further bonding within the material.

In a first embodiment, an aqueous suspension comprising at least one type of fiber, at least one surfactant and, optionally, strength agents, foam stabilizers, and softeners. The aqueous suspension is aerated to generate a foam by any known means, such as mechanical stirring or air injection. Then of the foam is provided into a mold of a pre-selected geometry. The foam is then dried by various methods such as direct heat, infrared radiation, or freeze-drying, or any combination thereof. Finally, various treatments such as fiber welding, calendaring, strength treatments, softening treatments, or dyeing, or any combination thereof can be performed on the molded garment, or portion thereof.

The method according to the invention also comprises an alternative embodiment in which at least one prefabricated fibrous nonwoven piece of material is used in the place of the fibrous material produced by foam to be subject to the various treatments such as those listed above in connection with the foam forming operation.

The fiber in the present examples may be of lignocellulosic, cellulosic, chitinous, or proteid nature, from any virgin or recycled source, natural or synthetic, or any combination thereof. Recycled sources can be from sources such as post-consumer/waste clothing, agricultural waste, or post-consumer/waste paper are often preferred. Natural fibers may be from wood or non-wood sources. Wood sources can be softwood trees such as pine, fir, hemlock, cedar, or spruce, or hardwoods trees such as maple, birch, eucalyptus, and aspen. Non-wood sources can be comprised of plant and fungal fiber sources such as cotton, hemp, jute, bamboo, ramie, reed, flax, kapok, mycelium, and bagasse, or from other animal sources such as chitosan, wool, silk, hair, skin, or fur, or lab-grown or cultured versions thereof. Synthetic fibers may be formed from regenerated cellulose, such as in the case for viscose rayon, lyocell, cupro, or modal.

The aqueous suspension is comprised of between 0.1 and 5% fiber by weight, as well as at least one surfactant comprising 0.01-2% of the suspension by weight. The surfactant can be anionic such as sodium lauryl sulfate, non-ionic such as lauryl glucoside, cationic such as alkyl-benzene ammonium chloride, or amphoteric such as cocamidopropyl betaine, or any combination thereof.

The suspension may also contain modifiers like a foam stabilizer such as sodium chloride, cellulose nanofibers, graphene oxide, flour, or talcum powder, a strength agent such as rosin, alkyl ketene dimer, alkyl succinic anhydride, chitosan, or polyamide-epichlorohydrin, and/or a softener such as glycerin, a-monoglyceride, sorbitol, urea, polyethylene glycol, or mannitol, or any combination thereof. Some modifiers require dissolution in a solvent or other processing prior to use. Chitosan has been found to have particular utility. For example, starch at concentrations between 0.1 and 10% by weight is cooked in water at temperatures between 100 and 130° C. to dissolve, chitosan at concentrations between 0.25 and 3% by weight is dissolved in water containing 3-5% acetic acid by weight, and cellulose nanofibers between 0.5-3% by weight is dispersed by ultra-sonication, all prior to combination into the suspension.

The suspension is then aerated to incorporate air into the suspension to create a wet foam, as well as thoroughly mix all constituents of the suspension. The total air content may be between 20 and 90% by volume. Different methods may be used for aeration, such as mechanical vortex mixing with a bladed or non-bladed impeller, a magnetic bar, or a ridged or smooth cylinder, with a mixing vessel with or without baffles or ridges to encourage vortex formation and shearing. Non-mechanical mixing methods may also be used, such as air injection, wherein micrometer-scale bubbles of controlled size are streamed into the suspension to produce a well-mixed foam with a narrow variation in bubble size. Aeration may also be achieved through any combination of processes thereof.

The wet foam is then poured into a mold to drain water from the foam and create a dry foam which constitutes a nonwoven, structured in the shape of a clothing item with at least one three-dimensional contour. The mold is principally comprised of positive and negative portions with evenly distributed holes leading to channels to drain water from the foam. These mold portions are in the shape of a clothing item with at least one three-dimensional contour.

The mold may also have a secondary component of a finer screen material in the shapes of the positive and negative molds to provide a fine mesh screen through which fibers and solid constituents of the foam cannot pass through, while allowing water to drain through. This screen may also be detachable from the main mold body and used as a stabilizing support for the foam during further processing. The mold may alternatively be comprised of a simple planar screen to produce a flat finished product, or a conveyor belt system to produce continuous rolls of material.

During the draining of water from the foam, different methods of accelerating and/or improving the quality of drainage or removal of water through other methods, such as the application of a vacuum pressure, centripetal force by rotation, or application of pressure by vacuum-bagging, airbag, or water-bag, or any combination thereof. Heating methods may also be applied such as convective heating in/around the mold, conductive heating directly through/from the mold, radiative infrared heating in/on them old, or any combination thereof. Heating is generally applied close to the boiling point of water, generally between 90 and 120° C. Cold drying methods may also be applied, such a freezing at temperatures between −50 and −10° C. followed by freeze-drying at temperatures between −150 and −90° C. and pressures between 0.01 and 0.05 mbar.

To perform fiber welding, the produced foam nonwoven is then saturated with an appropriate solvent. In the case of cellulosic fibers, appropriate solvents such as N-methylmorpholine N-oxide, urea with sodium hydroxide in water, thiourea with sodium hydroxide in water, zinc oxide with sodium hydroxide in water, or lithium chloride with dimethylacetamide, or any combination thereof, may be applied. For sodium hydroxide-based solvents, the concentration of sodium hydroxide may be between 5 and 15% by weight, with other constituents at concentrations between 0.5 and 5% by weight.

Once the nonwoven is saturated, the fibers are partially dissolved along the surfaces to facilitate bonding between fibers. Some solvents may then require freezing at temperature between −25 and −10° C. for a duration between 2 and 24 hours. Saturated nonwovens are then pressed with pressures between 20 and 120 Pa for a duration between 10 and 240 min. Pressure can be applied by different methods such as direct weight, application of vice grips or pneumatic/hydraulic presses, vacuum bagging, airbags, water-bags, or any combination thereof. Pressing may be performed between two pieces of absorbent material to facilitate even pressure as well as removal of excess solvent. During pressing, partially dissolved surfaces of fibers are brought into contact to allow for melding of fibers and realization of strong fiber bonding and partial collapse of the nonwoven structure. Once pressed, the nonwoven is washed with an antisolvent such as water, ethanol, isopropanol, acetone, or any combination thereof to remove the solvent and dried at room temperature, yielding a thinner, stronger, more flexible nonwoven with a smoother, leathery hand feel.

The produced nonwoven may be subject to a variety of treatments, such as calendaring, strength treatments, softening treatments, or dyeing, or any combination thereof.

In a second embodiment of the invention, fiber is directly applied to the mold surface without use of a foam carrier medium. Acceptable forms of such fiber include, but are not limited to, fiber batting, felt, paper, fluff, loose fibers, tissue, and nonwoven textile fabric produced from fiber sources such as those listed above such as cotton, wool, kapok, jute, chitin, or any combination thereof, which replaces the dry foam produced by the previously described processes.

In this embodiment, fibers or nonwovens, or any combination thereof, are saturated in a suitable solvent, partially dissolving the surfaces of fibers to facilitate bonding between fibers. For example, in the case of cellulosic fibers, appropriate solvents such as N-methylmorpholine N-oxide, urea with sodium hydroxide in water, thiourea with sodium hydroxide in water, zinc oxide with sodium hydroxide in water, or lithium chloride with dimethylacetamide, or any combination thereof, may be applied. For sodium hydroxide-based solvents, the concentration of sodium hydroxide may be between 5 and 15% by weight, with other constituents at concentrations between 0.5 and 5% by weight. The solvent may also be loaded with dissolved cellulose between 0.5 and 10% by weight prior to application onto the fibers or nonwovens. Solvent can be applied by various methods such as spraying, dipping, painting, extruding, or screen printing, or any combination thereof. The saturated material is then applied directly onto a positive or negative mold or a combination thereof. The mold may also have a secondary component of a finer screen material in the shapes of the positive or negative molds to provide a fine mesh screen through which fibers and solid constituents of the foam cannot pass through, while allowing water to drain through. This screen may also be detachable from the main mold body and used as a stabilizing support for the foam during further processing.

Some solvents may then require freezing at temperature between −25 and −10° C. for a duration between 2 and 24 hours. Saturated nonwovens may then pressed with pressures between 20 and 120 Pa for a duration between 10 and 240 min. Pressure can applied by different methods such as direct weight, application of vice grips or pneumatic/hydraulic presses, vacuum bagging, airbags, water-bags, or any combination thereof. Pressing may be performed between two pieces of absorbent material to facilitate even pressure as well as removal of excess solvent. Following saturation or pressing, the nonwoven is washed with an antisolvent such as water, ethanol, isopropanol, acetone, or sulfuric acid, or any combination thereof to remove the solvent and dried at room temperature, yielding a cohesive, fiber-welded nonwoven material.

The produced nonwoven may be subject to a variety of treatments, such as calendaring, strength treatments, softening treatments, or dyeing, or any combination thereof.

In operation, when utilizing a 3D printing process, natural fibers are first broken down or partially broken down with solvent, creating a paste/slurry that can be extruded and used as an ink for 3D printing a shaped object. A garment is designed using a computer and appropriate software. The resulting design is then transmitted to the 3D printer and the 3D printer, through an additive process, prints the three-dimensional garment (or portion thereof). Heat is provided shortly after the fiber and solvent mixture is extruded from the printer for a pre-determined amount of time to cause the chemical reaction between the solvent and fibers to occur. The chemical reaction causes bonds (preferably covalent bonds) to form between the fibers, resulting in a cloth-like material having the desired contours.

Alternatively, as noted above, a similar process can be utilized where the fiber and solvent mixture is provided in an initial volume. Heat is then applied to specific parts of the mixture, creating chemical reactions to occur at the location where the heat is applied to the fiber and solvent mixture. Similar to the example provided above, a three-dimensional cloth-like object is formed from the initial volume of mixture. The remainder of the material is removed and can, optionally, be reused.

In both cases, color dyes can be introduced into the process beforehand or at any stage, depending on the desired effect.

Referring now to processes where the garment, or portion thereof, can be formed using a type of mold using a form with a pre-determined shape that includes at least one contour. Exemplary embodiments of molding methods are provided below.

Figure 4:
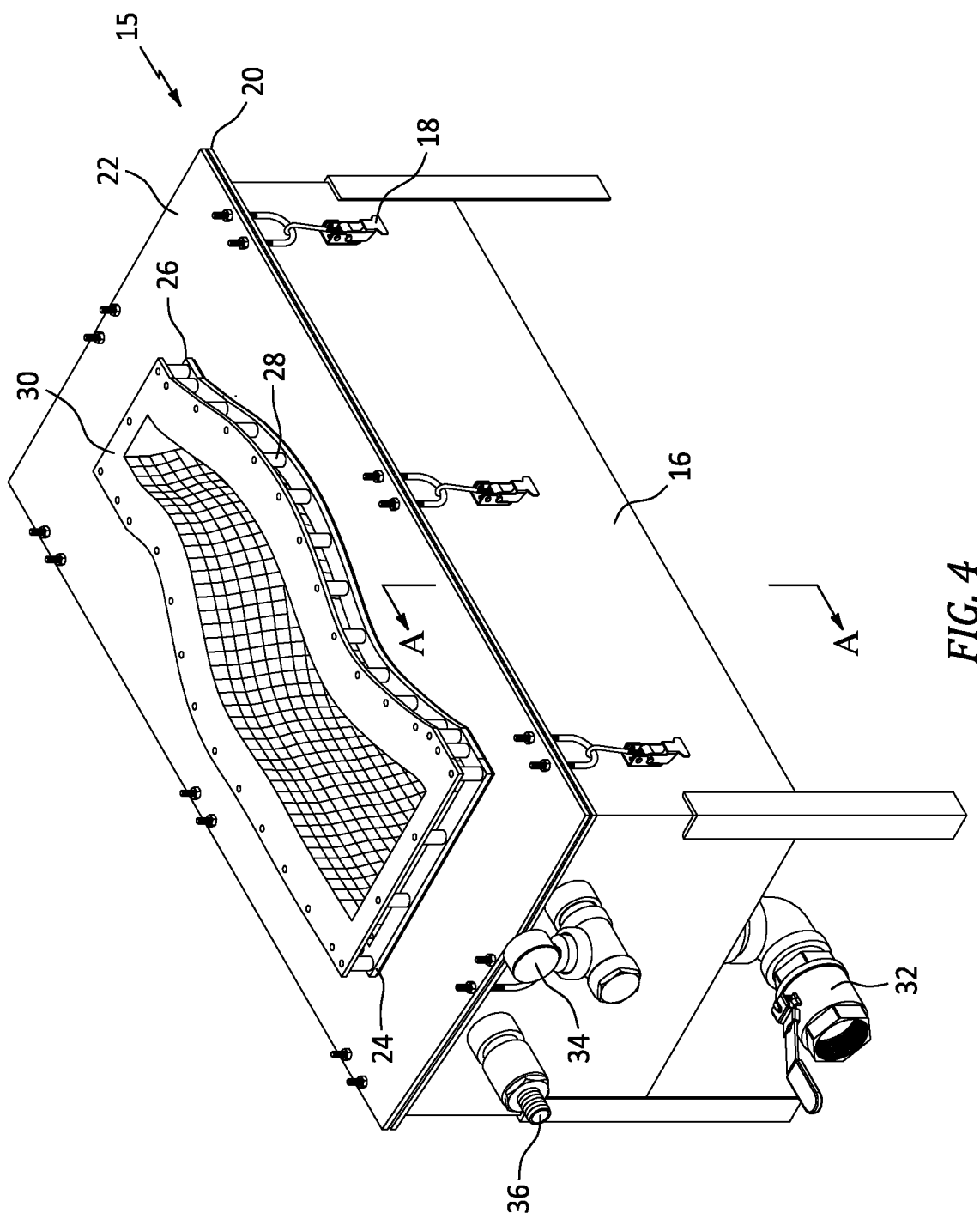
FIG. 4 is an isometric view of a molding apparatus.
Figure 5:
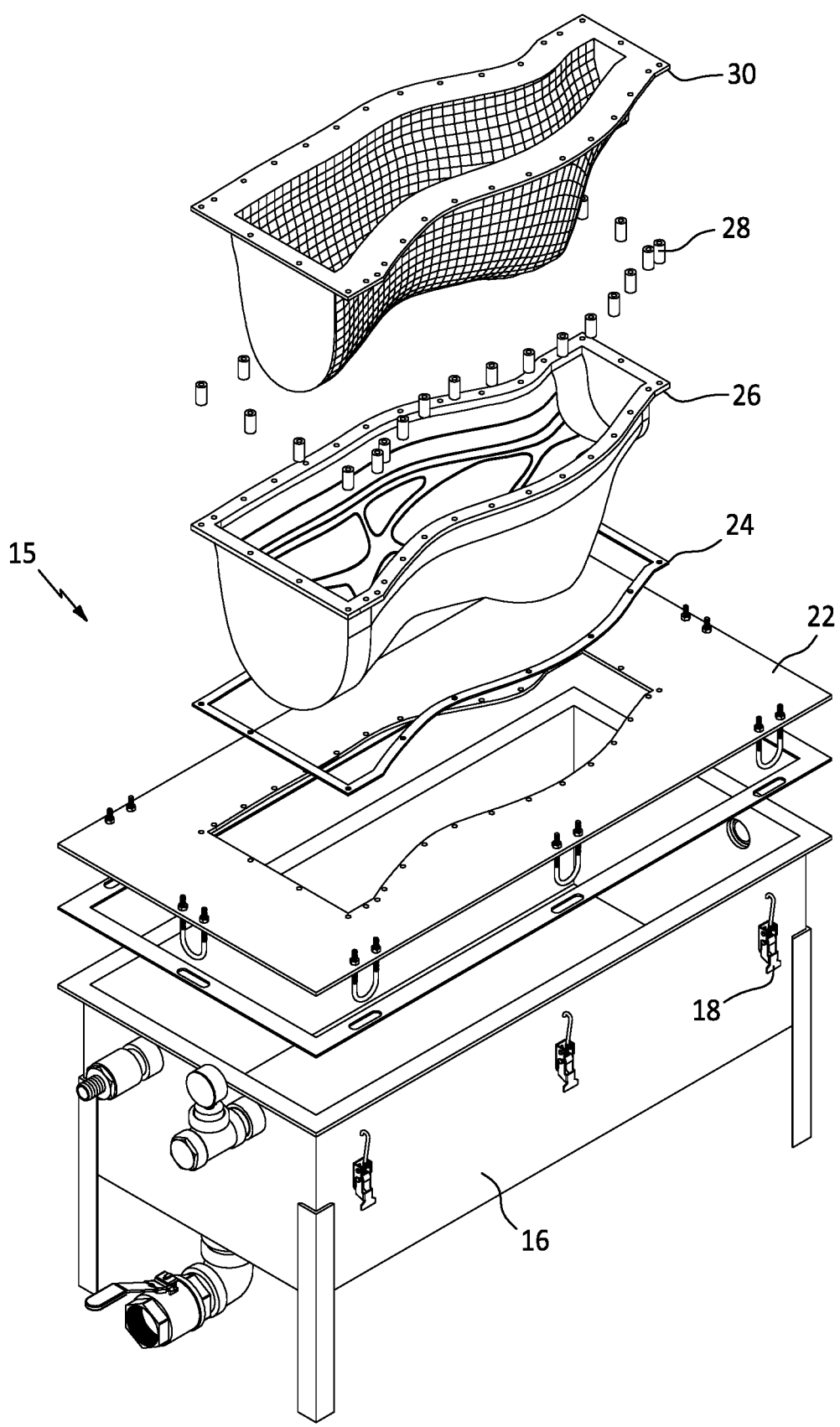
FIG. 5 is an exploded view of the molding apparatus shown in FIG. 4.

In a first example, and now referring to FIGS. 4-5, a first method involving pouring foam into a fixed mold with positive and negative sides is described using a mold apparatus 15. The mold apparatus 15 includes vacuum chamber 16, latching means 18, vacuum chamber seal 20, removable lid 22, lower porous mold vacuum seal 24, lower porous mold 26, molding spacers 28, upper porous mold 30, vacuum chamber drain 32, pressure gauge 34, and an air inlet 36. The removable lid 22 is generally positioned over the vacuum chamber 16 forming an appropriate seal between the components. The removable lid an internal opening designed to receive the lower porous mold 26. In the embodiment show, the upper porous mold 30 is positioned generally in the lower porous mold 26 with a lower porous mold vacuum seal 24 placed therebetween to create an appropriate seal. Molding spacers 28 can be placed between the upper and lower mold portions 26,30 to define the gap therebetween (see e.g., FIG. 6).

The solution with dispersed fibers is blended with a stirrer, mixer, blender, compressed gas or any other means of adding gas into the solution, to create a foam. The foam is poured, extruded, sprayed or released into the mold apparatus 15 between the lower porous mold 26 and the upper porous mold 30. The distance between the two mold portions 26,30 is initially wider than the desired finished product. For example, for a desired finished thickness of approximately 1 mm to 2 mm, the initial mold may have a space of approximately 1 cm to 4 cm between the mold portions 26,30. If necessary, even distribution of foam against the walls of the mold can be aided by applying vacuum pressure from the vacuum chamber 16 or the application of a centrifugal force.

The mold portions 26,30 should have holes or be porous in some way to allow for liquid drainage during the forming process. The pores in the mold portions 26,30 are generally less than 1 mm in effective diameter to allow liquid to pass therethrough but to prevent the molded material from exiting the mold portions 26,30. The actual size may be dictated by the designer and desired finished product. As the liquid drains, gas bubbles are left behind. These bubbles (foam) generally behave as a solid even when wet and are permitted to dry. As the gas bubbles dry, they form a lightweight and generally flexible non-woven bonded structure. During the drying process, the structure of the foam is malleable and may be manipulated so that the clothing item (or portion thereof) takes on a shape different than the original shape, if desired.

Figure 6:
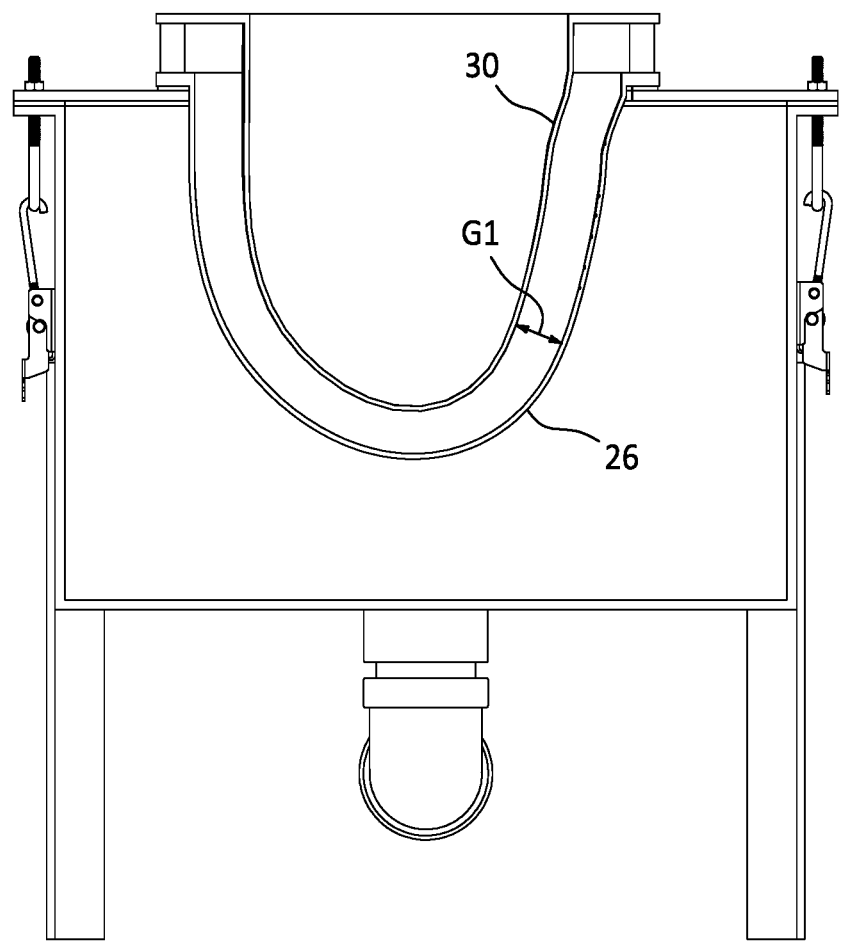
FIG. 6 is a sectional view along line A-A of FIG. 4 showing the mold portions at a gap identified as G1.
Figure 7:
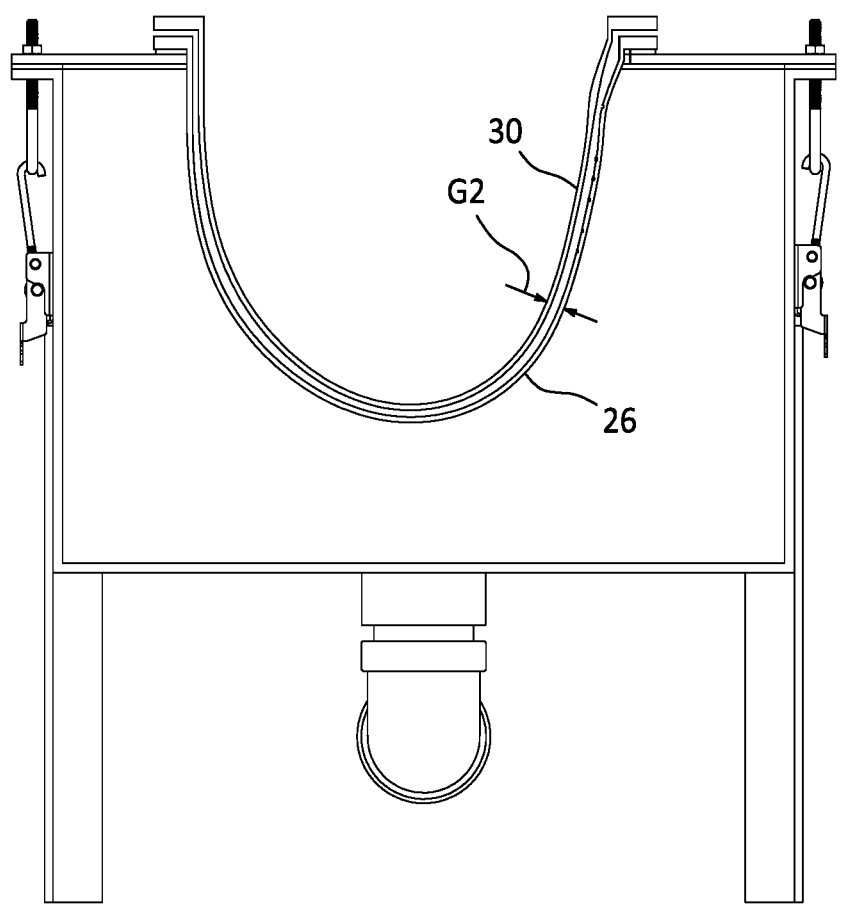
FIG. 7 is a sectional view along line A-A of FIG. 4 showing the mold portions at a gap identified as G2.

Referring now to FIGS. 6 and 7, a sectional view of the two mold portions 26,30 are shown having a gap therebetween (compare G1 and G2). FIG. 6 generally shows the two mold portions 26,30 having a generally larger offset (G1) at the commencement of the molding process than the gap (G2) that is shown in FIG. 7 at the final stages of the garment creation process. In some embodiments, the gap G1 between complimentary portions of the mold portions 26,30 can be approximately 1 cm to 4 cm at the commencement of the molding process. In some embodiments, the gap G2 between complimentary portion of the mold portions 26,30 can be approximately 1-2 mm.

In embodiments where it is desired to reduce the foam thickness, one or more combinations of the following can be used: 1) Pressure applied by positive and negative mold parts to achieve a smaller offset; 2) Pressure applied by hand or hand-held tools; 3) Pressure applied by vacuum bag, water bag or pneumatic system; 4) Pressure and heat applied by heated mold; 5) Pressure and heat applied by hand-held iron; and 6) Chemical post treatments, for the purpose of strengthening bonds or improving mechanical properties such as, but not limited to, softness, flexibility, and hydrophobicity. Such treatments include but are not limited to: NMMO, MA treatment, vapor phase treatment, glycerine, PLA, ionic liquid. Numerous methods for altering the gap between the mold portions can be utilized.

Figure 8:
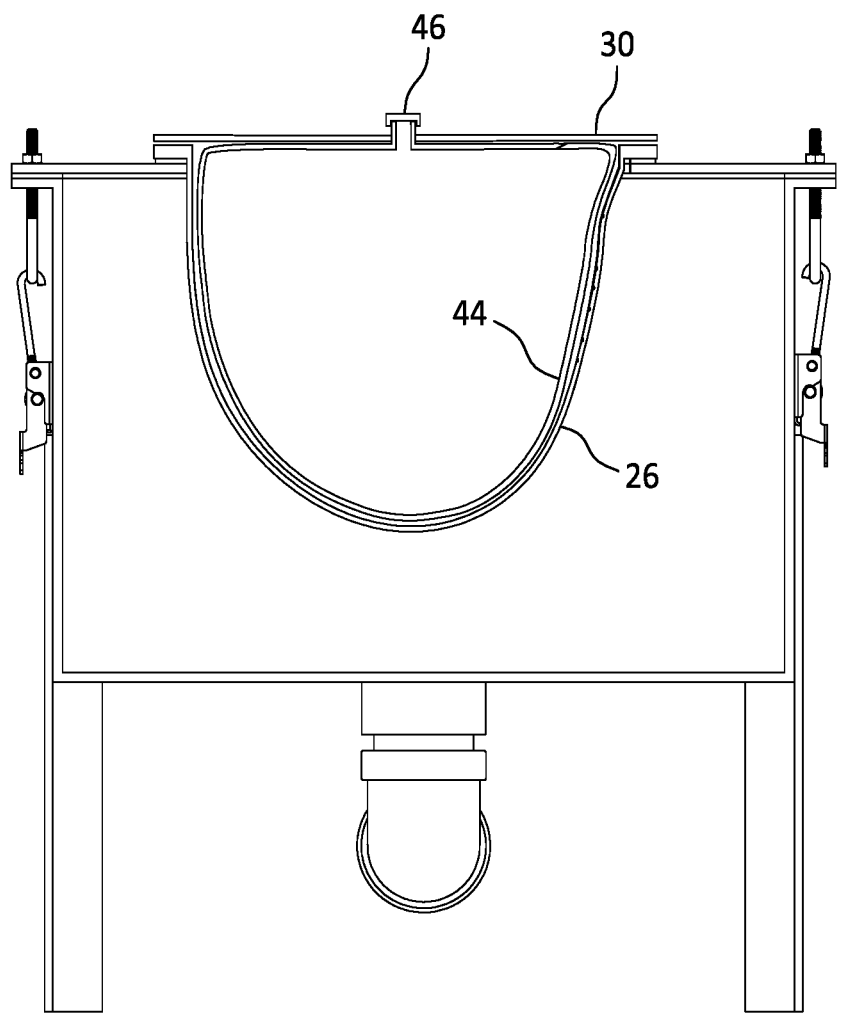
FIG. 8 is a sectional view along line A-A of FIG. 4 where an inflatable bladder is positioned between the mold portions.

In addition, and now referring to FIG. 8, an inflatable internal bladder 44 can be installed between the mold portions 26,30 and inflated through an air inlet 46. As the internal inflatable bladder 44 is inflated, the internal inflatable bladder 44 applies pressure to the molded part, forming the desired shape.

Figure 9:
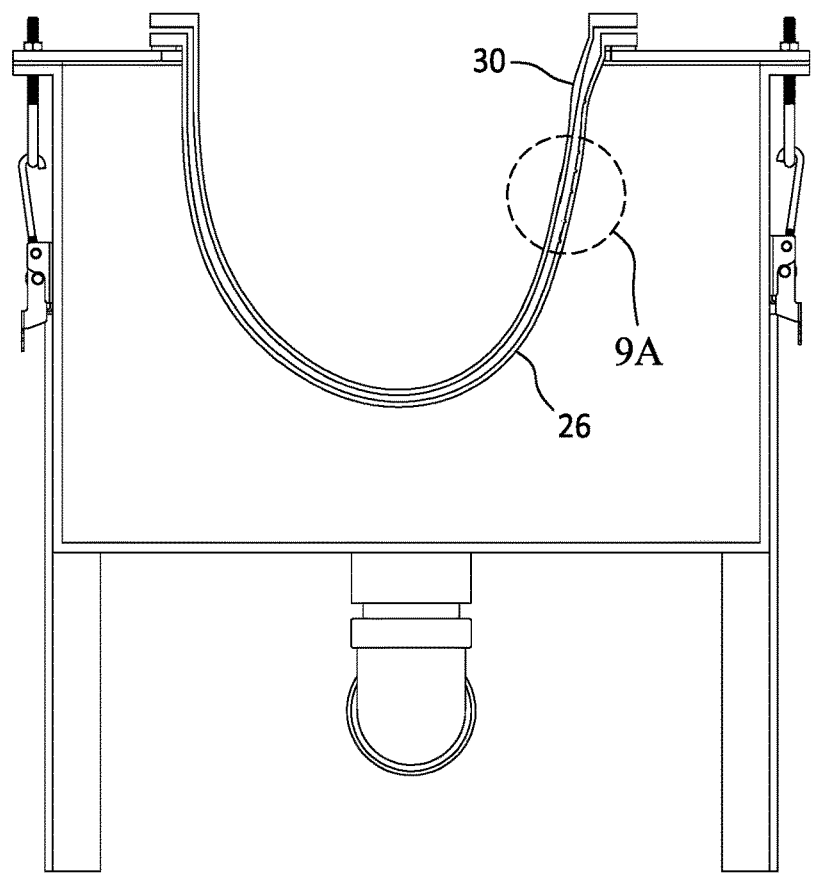
FIG. 9 is a sectional view along line A-A of FIG. 4 showing a mold portion having at least one indentation.
Figure 9A:
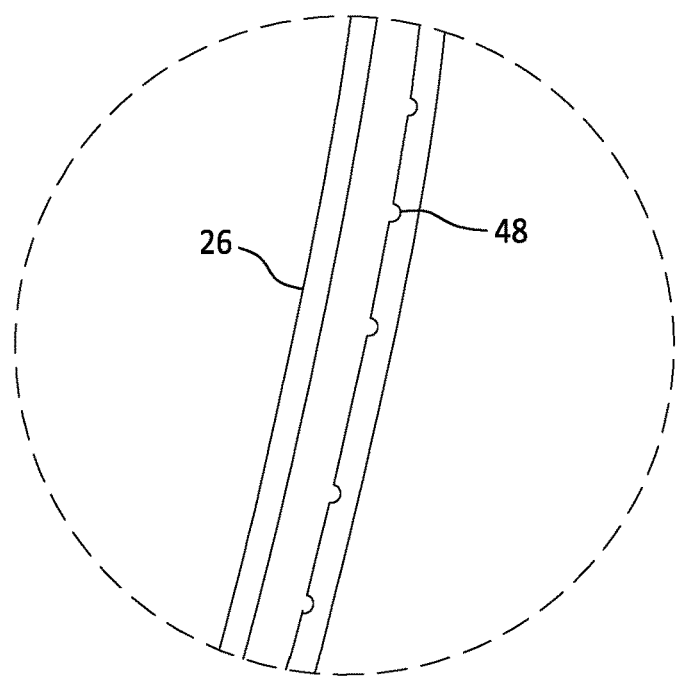
FIG. 9A is an enlarged view of FIG. 9 showing the mold portion having at least one indentation.

If desired, the thickness of the resulting molded part may be locally reduced in some areas more than others. For example, as shown in FIGS. 9 and 9A, one or more of the mold portions 26,30 may include one or more features (e.g., indentations) 48. The indentations 48 can be used for a wide variety of purposes including, but not limited to, adding texture to the garment. In a garment with areas of different local thicknesses, the behavior of each area may be different, allowing for some areas to, for example, be more flexible than others. This could be advantageous for clothing items that would normally need pads, horsehair canvas, boning, or other structural elements, because similar results could potentially be achieved in one piece with one type of material. The reduction in the number of different elements would have the benefit of allowing garments to be recycled with less dismantling necessary. Hand labor and/or secondary operations needed to finalize the garment may also be advantageously eliminated as a result. In a first example, and referring generally to FIGS. 4 and 5, shaping loose and/or non-woven fibers with a mold is described. Dry fibers can be shaped into 3-dimensional shapes by stretching/pressing into a mold. The fibers can be supplied as batting, wadding, felt, fluff, cut or continuous roving, loose fibers or other non-woven configuration of fibers. The fibers are saturated with a solution containing solvent (such as NaOH/ZnO (8.1%/1.3%) solution), salt, or a binding agent/glue, then pressed into a mold, then dried, then rinsed.

In the case of loose fibers, fluff or cut roving, the fibers may be dispersed into a liquid and pulled against a mold by using a vacuum fitted with a filter which blocks fibers from passing through but allows the liquid to pass through. The mold can then be taken out of the liquid/fiber dispersion as the vacuum still presses the fibers into shape. The fibers on the mold can be disconnected from the vacuum and allowed to dry. The drying fibers can be placed in a freezer, freeze-dried, allowed to air dry at room temperature, or placed in a heating device such as an oven, infrared heater, etc.

In the case of batting, felt, wadding or continuous roving, the fibers can be saturated with a solvent (such as NaOH/ZnO (8.1%/1.3%) solution), salt, or a binding agent/glue, then stretched by hand over a mold and pressed against the surface or a positive or negative mold, or between a positive and negative mold. The fibers are then allowed to dry by placing them in a freezer or freeze-drier, allowing them to air dry at room temperature, or placing them in a heating device such as an oven or infrared heater Alternatively, in the case of batting, felt, wadding or continuous roving, the fibers can be saturated with a solvent (such as NaOH/ZnO (8.1%/1.3%) solution), salt, or a binding agent/glue, then inserted into high pressure molding system. The molding system would consist of a hydraulic press with a negative and positive mold that uses high pressure to form the material into the shape of the molds. The fibers are then allowed to dry by placing them in a freezer or freeze-drier, allowing them to air dry at room temperature, or placing them in a heating device such as an oven, infrared heater, etc.

In a third example, fibers are broken down or partially broken down with solvent, creating a slurry. The slurry sits in a bath and a shaped filter head that has a complementary shape to the desired shape of the garment is submerged into the mix. This filter head, or mold form, is attached to a vacuum. The vacuum creates a suction force that draws the water, but not the fibers, in the fiber and solvent mixture through the holes in the filter. The fibers do not pass through the holes of the filter, and therefore they cling to the shape of the mold, creating a layer of natural fibers having at least one three-dimensional contour. Heat can be applied either directly from contact with the mold or from an outside heat source, such as a laser or other type of radiation, hot metal or ultrasonic vibration. The heat catalyzes the chemical reaction, bonding the fibers together at the molecular level. After the vacuum is switched off and the now-bonded fibers are peeled or blown away from the molded filter. The texture of the garment will depend on the surface texture and material of the mold.

In a fourth example, fibers are broken down or partially broken down with solvent, creating a fiber and solvent mixture, preferably in the form of a gel or paste. The fiber and solvent mixture is extruded either onto, or from within, a shaped mold form. If the mixture is extruded from within the mold, a series of small holes around the mold (that serve as a pathway from the inside of the mold to the mold's surface) may be used to evenly distribute the mixture onto the outside of the mold itself. Heat is applied either by direct contact with or close proximity to the mold itself, or by laser or other type of radiation, or by ultrasonic vibration. The mold is opened and removed, and the now-bonded fibers have been formed into the shape of the mold and include at least one three-dimensional contour. The texture of the garment will depend on the surface texture and material of the mold.

In a fifth example, fibers are supplied as a sheet of non-woven fluff/batting which, if so desired, can be flattened and/or needle-punched in advance (i.e., to add strength while maintaining thinness). A mold form is pressed over the fiber batting. Solvent or bonding agent is added. In the case of solvent, a catalyst is then applied from an appropriate heat source (e.g., a heating element, laser, etc.). In the case of bonding agent (e.g., glue), the form is allowed to dry. The mold is removed and the fiber sheet retains the shape of the mold and includes at least one three-dimensional contour. Any excess material around the edges is cut away and can be reused or recycled. The texture of the garment will depend on the surface texture and material of the mold.

It is known to one of skill in the art that aspects of each example disclosed above can, in many instances, be utilized with the teachings of the other examples without departing from the spirit and scope of the present invention.

In one example, the above processes can be used to produce garments in a central factory, either by mass production or custom production. The process can be used either for the entire garment, or a portion of a garments. Once the garment, or portion thereof, is formed, it can be shipped either to stores or directly to the consumer.

In another example, the above processes can be used to produce garments locally. For example, because the garment design is, in many instances, digitized, the file is transferred from the designer, and the item is printed locally by either a local factory or even at home on demand by the end user.

As noted above, the above processes can be further be used as an alternative to manufacturing traditional two-dimensional fabric, independent from the clothing/garment-making process. Large sheets of fibers, bonded in a way consistent with the inventions in this patent, may be used to produce flooring, furniture-making, home interior decorations, and through various other applications.

In any of the above examples, post forming operations are also possible and often desirable. For example, suitable post forming operations include NMMO treatment of foam formed fibrous material, vapor phase treatment, and MA and chitosan treatment of treated cotton batting. With respect to NMMO treatment of foam formed fibrous material, the foam formed garment still in the mold is fully saturated by immersion in 50% NMMO. A reaction is allowed to occur at or about room temperature for 24 hours. With respect to vapor phase treatment, a fatty chlorhyde acid is applied in a liquid state onto fibrous material by spraying. The temperature is increased sufficiently to bring the fatty chlorhyde acid to a gaseous state. With respect to MA and chitosan Treatment of 8% NaOH and 1.3% ZnO treated cotton batting, the 8% NaOH and 1.3% ZnO treated cotton batting are dipped in 1% MA solutions (dissolved in acetone) for 24 hours, then air dried at or about 25° C. Subsequently, these cotton battings are dipped into a 2% (v/v) acetic acid aqueous solution containing 1% chitosan for another 24 hours. To remove excess chitosan solution, the cotton battings can be, e.g., placed between two pieces of blotting paper or sponged with blotting paper, or a hand-roller may be used. Finally, the impregnated cotton batting is dried in air and cured. One of skill in the art would also know that the above specific examples of post-forming operations could also be modified to be suitable for use with any of the forming operations disclosed herein.

One of skill in the art would know that additional embodiments, or variations to the above description can be made without departing from the spirit or scope of the invention.

We claim:

1. A method of making at least a portion of a garment, the method comprising the following steps:

providing an amount of a fiber and solvent mixture that includes a plurality of fibers and a solvent that is capable of causing covalent bonds to be created between the fibers;

providing a mold form that defines at least one three-dimensional contour;

providing the amount of fiber and solvent mixture to the mold form; and removing at least a portion of the solvent capable of causing covalent bonds, from the fiber and solvent mixture while the fiber and solvent mixture is on the mold form.

2. The method of claim 1, wherein the solvent is capable of causing covalent bonds to be created between the fibers when a catalyst is provided to the fiber and solvent mixture.

3. The method of claim 2, wherein the method further comprises the step of providing heat as the catalyst to cause a plurality of bonds to form between the fibers in the fiber and solvent mixture.

4. The method of claim 1, wherein substantially all of the fibers provided have a length between approximately 0.1 cm and about 7.5 cm.

5. The method of claim 4, wherein the plurality of fibers includes at least some natural fibers.

6. The method of claim 5, wherein the plurality of fibers consists of natural fibers.

7. The method of claim 4, wherein the plurality of fibers includes at least some synthetic fibers.

8. The method of claim 7, wherein the plurality of fibers consists of synthetic fibers.

9. The method of claim 1, wherein the solvent includes ionic salts in water.

10. The method of claim 1, wherein the at least a portion of a garment includes an entire garment.

11. The method of claim 1, wherein the method further comprises the step of attaching the at least a portion of a garment to a second portion of a garment in a secondary operation.

* * * * *